(12) United States Patent
Vasseur et al.

(10) Patent No.: US 9,338,065 B2
(45) Date of Patent: May 10, 2016

(54) PREDICTIVE LEARNING MACHINE-BASED APPROACH TO DETECT TRAFFIC OUTSIDE OF SERVICE LEVEL AGREEMENTS

(71) Applicant: Cisco Technology, Inc., San Jose, CA (US)

(72) Inventors: Jean-Philippe Vasseur, Saint Martin d'Uriage (FR); Grégory Mermoud, Veyras (CH); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 101 days.

(21) Appl. No.: 14/164,425

(22) Filed: Jan. 27, 2014

(65) Prior Publication Data

US 2015/0195149 A1    Jul. 9, 2015

Related U.S. Application Data

(60) Provisional application No. 61/923,910, filed on Jan. 6, 2014.

(51) Int. Cl.
*H04L 12/26* (2006.01)
*H04L 12/24* (2006.01)
*H04L 12/851* (2013.01)
*G06N 7/00* (2006.01)
(Continued)

(52) U.S. Cl.
CPC ............ *H04L 41/5009* (2013.01); *G06N 7/005* (2013.01); *G06N 99/005* (2013.01); *G06Q 10/04* (2013.01); *H04L 12/2472* (2013.01); *H04L 41/147* (2013.01); *H04L 41/5019* (2013.01); *H04L 47/2425* (2013.01); *H04L 41/12* (2013.01); *H04L 41/16* (2013.01)

(58) Field of Classification Search
None
See application file for complete search history.

(56) References Cited

U.S. PATENT DOCUMENTS

| 6,577,597 B1 | 6/2003 | Natarajan et al. |
| 6,694,471 B1 | 2/2004 | Sharp |
| 6,769,024 B1 | 7/2004 | Natarajan et al. |

(Continued)

FOREIGN PATENT DOCUMENTS

| EP | 2 469 758 A1 | 6/2012 |
| WO | WO 03/084133 A1 | 10/2003 |

OTHER PUBLICATIONS

Fan, N., "Learning Nonlinear Distance Functions Using Neural Network for Regression with Application to Robust Human Age Estimation", IEEE International Conference on Computer Vision (ICCV), Nov. 2011, pp. 249-254, Institute of Electrical and Electronics Engineers, Barcelona, Spain.

(Continued)

*Primary Examiner* — Jutai Kao
(74) *Attorney, Agent, or Firm* — Parker Ibrahim & Berg LLC; James M. Behmke; Stephen D. LeBarron

(57) ABSTRACT

In one embodiment, a request to make a prediction regarding one or more service level agreements (SLAs) in a network is received. A network traffic parameter and an SLA requirement associated with the network traffic parameter according to the one or more SLAs are also determined. In addition, a performance metric associated with traffic in the network that corresponds to the determined network traffic parameter is estimated. It may then be predicted whether the SLA requirement would be satisfied based on the estimated performance metric.

25 Claims, 6 Drawing Sheets

(51) Int. Cl.
*G06N 99/00* (2010.01)
*G06Q 10/04* (2012.01)

(56) References Cited

U.S. PATENT DOCUMENTS

| | | |
|---|---|---|
| 6,785,239 B1 | 8/2004 | Tasker |
| 6,886,040 B1 | 4/2005 | Fitzgerald |
| 6,961,573 B1 | 11/2005 | Moon et al. |
| 6,973,034 B1 | 12/2005 | Natarajan et al. |
| 7,092,410 B2 | 8/2006 | Bordonaro et al. |
| 7,457,877 B1 | 11/2008 | Shah et al. |
| 7,568,045 B1 | 7/2009 | Agrawal |
| 7,606,895 B1 | 10/2009 | Dini et al. |
| 7,613,128 B2 | 11/2009 | Castagnoli et al. |
| 7,680,047 B2 | 3/2010 | Vadlakonda et al. |
| 7,724,676 B2 | 5/2010 | Gerstel et al. |
| 7,948,910 B2 | 5/2011 | Arbel et al. |
| 8,005,000 B1 | 8/2011 | Srinivasan |
| 8,369,213 B2 | 2/2013 | Vasseur et al. |
| 8,605,591 B2 | 12/2013 | Shaffer et al. |
| 8,630,177 B2 | 1/2014 | Vasseur et al. |
| 8,630,291 B2 | 1/2014 | Shaffer et al. |
| 8,634,314 B2 | 1/2014 | Banka et al. |
| 8,638,778 B2 | 1/2014 | Lee et al. |
| 2006/0072471 A1* | 4/2006 | Shiozawa ............... 370/248 |
| 2006/0083193 A1* | 4/2006 | Womack ............ H04W 48/18 370/328 |
| 2007/0083650 A1* | 4/2007 | Collomb ............. G06Q 10/04 709/224 |
| 2008/0140817 A1* | 6/2008 | Agarwal ........... H04L 41/0677 709/223 |
| 2009/0010264 A1* | 1/2009 | Zhang ................... 370/395.21 |
| 2009/0019147 A1 | 1/2009 | Ahlers et al. |
| 2011/0085461 A1 | 4/2011 | Liu et al. |
| 2012/0155475 A1 | 6/2012 | Vasseur et al. |
| 2012/0233308 A1 | 9/2012 | Van De Houten et al. |
| 2012/0307653 A1 | 12/2012 | Vasseur et al. |
| 2013/0022053 A1 | 1/2013 | Vasseur et al. |
| 2013/0022083 A1 | 1/2013 | Vasseur et al. |
| 2013/0024560 A1 | 1/2013 | Vasseur et al. |
| 2013/0028103 A1 | 1/2013 | Hui et al. |
| 2013/0121331 A1 | 5/2013 | Vasseur et al. |
| 2013/0159479 A1 | 6/2013 | Vasseur |
| 2013/0159486 A1 | 6/2013 | Vasseur |
| 2013/0159550 A1 | 6/2013 | Vasseur |
| 2013/0201858 A1 | 8/2013 | Varma et al. |
| 2013/0223229 A1 | 8/2013 | Hui et al. |
| 2013/0250811 A1 | 9/2013 | Vasseur et al. |
| 2013/0311673 A1* | 11/2013 | Karthikeyan et al. ......... 709/239 |
| 2013/0336126 A1 | 12/2013 | Vasseur et al. |
| 2013/0336316 A1 | 12/2013 | Sudhaakar et al. |
| 2014/0003277 A1 | 1/2014 | Shim |
| 2014/0022928 A1 | 1/2014 | Zingale et al. |
| 2014/0092753 A1 | 4/2014 | Vasseur et al. |

OTHER PUBLICATIONS

Fortunato, S., "Community Detection in Graphs", arXiv:0906.0612v2.pdf [physics.soc-ph]; Physics Reports 486, 75-174, Jan. 2010, 103 pages.

Hui, et al., "An IPv6 Routing Header for Source Routes with the Routing Protocol for Low-Power and Lossy Networks (RPL)", Request for Comments 6554, Mar. 2012, 13 pages, Internet Engineering Task Force Trust.

Newman, et al., "Modularity and Community Structure in Networks", Proceedings of the National Academy of Sciences of the United States of America, Jun. 2006, vol. 103, No. 23, pp. 8577-8582, PNAS, Washington, DC.

Newman, M. E. J., "Analysis of Weighted Networks", http://arxiv.org/pdf/condmat/0407503.pdf, Phys. Rev. E 70, 056131, Jul. 2004, 9 pages.

Siddiky, et al., "An Efficient Approach to Rotation Invariant Face Detection Using PCA, Generalized Regression Neural Network and Mahalanobis Distance by Reducing Search Space", 10th International Conference on Computer and Information Technology, Dec. 2007, 6 pages, Dhaka, Bangladesh.

Ting, et al., "Variational Bayesian Least Squares: An Application to Brain-Machine Interface Data", Neural Networks, vol. 21, Issue 8, Oct. 2008, pp. 1112-1131, Elsevier.

Vasseur, et al., "Routing Metrics Used for Path Calculation in Low-Power and Lossy Networks", Request for Comments 6551, Mar. 2012, 30 pages, Internet Engineering Task Force Trust.

Vasseur, et al., "Learning-Machine-Based Predictive and Proactive Computer Networking and Associated Monitoring", U.S. Appl. No. 61/923,910, filed Jan. 6, 2014, 105 pages, U.S. Patent and Trademark Office, Alexandria, VA.

Winter, et al., "RPL: IPv6 Routing Protocol for Low-Power and Lossy Networks", Request for Comments 6550, Mar. 2012, 157 pages, Internet Engineering Task Force Trust.

International Search Report dated Mar. 30, 2015 issued in connection with PCT/US2015/010119.

Raghavendra V. Kulkarni et al.: "Computational Intelligence in Wireless Sensor Networks: A Survey", IEEE Communications Surveys, IEEE, New York, NY, US, vol. 13, No. 1, Jan. 1, 2011, pp. 68-96.

Alsheikh Mohammad Abu et al.: "Machine Learning in Wireless Sensor Networks: Algorithms, Strategies, and Applications", IEEE Communications Surveys & Tutorials, vol. 16, No. 4, Jan. 1, 2011, pp. 1996-2018.

* cited by examiner

A BAYESIAN NETWORK REPRESENTING THE JOINT PROBABILITY DISTRIBUTION OVER THREE RANDOM VARIABLES; X, Y, AND Z

BN FOR LINEAR REGRESSION

PREDICTIVE LEARNING MACHINE-BASED APPROACH TO DETECT TRAFFIC OUTSIDE OF SERVICE LEVEL AGREEMENTS

RELATED APPLICATION

This application claims priority to U.S. Provisional Application No. 61/923,910, filed Jan. 6, 2014, entitled: LEARNING-MACHINE-BASED PREDICTIVE AND PROACTIVE COMPUTER NETWORKING AND ASSOCIATED MONITORING, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
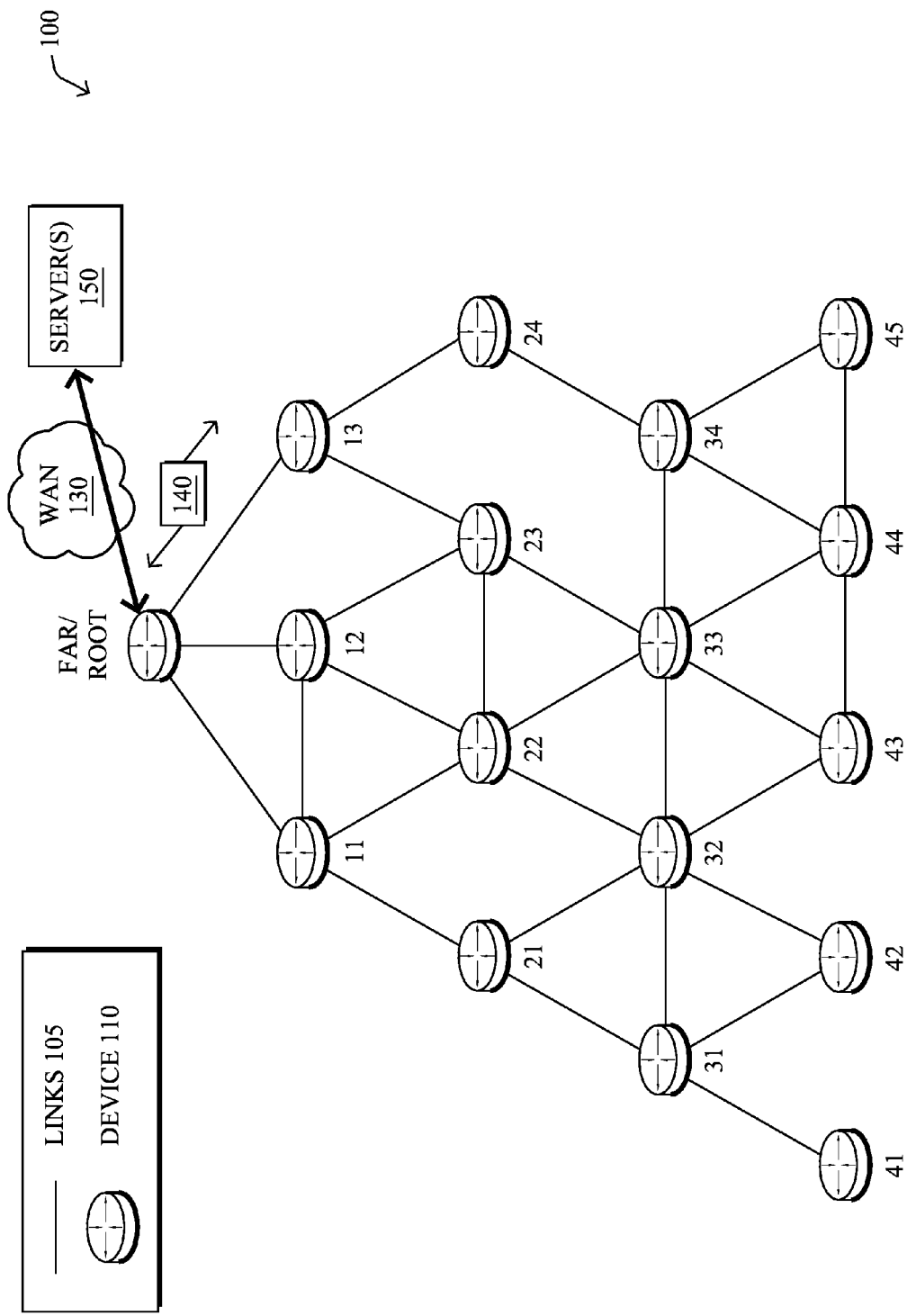
FIG. 1 illustrates an example communication network.

According to one or more embodiments of the disclosure, a request to make a prediction regarding one or more service level agreements (SLAs) in a network is received. A network traffic parameter (e.g., class of service (CoS)) and an SLA requirement associated with the network traffic parameter according to the one or more SLAs are also determined. In addition, a performance metric associated with traffic in the network that corresponds to the determined network traffic parameter is estimated. It may then be predicted whether the SLA requirement would be satisfied based on the estimated performance metric.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
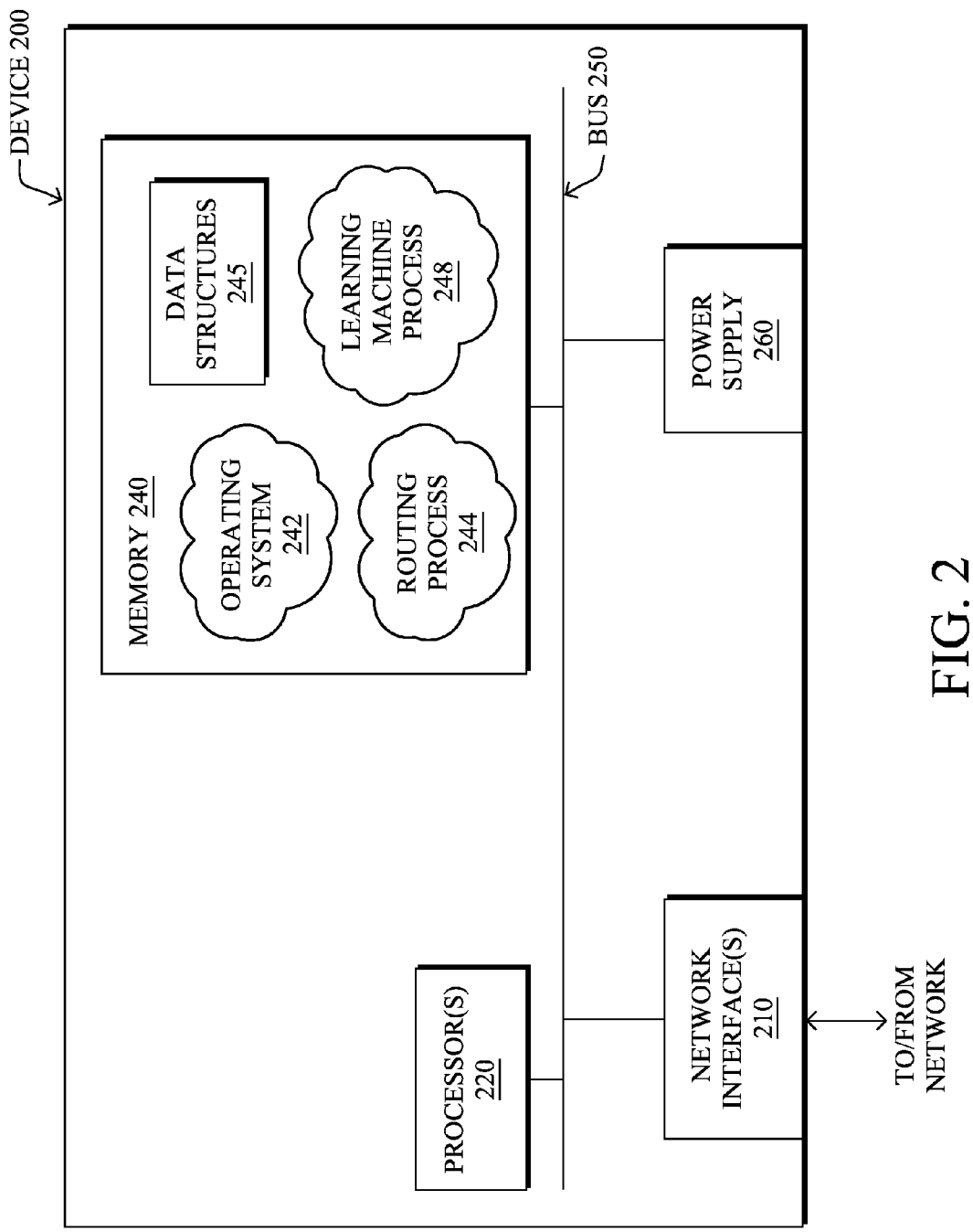
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
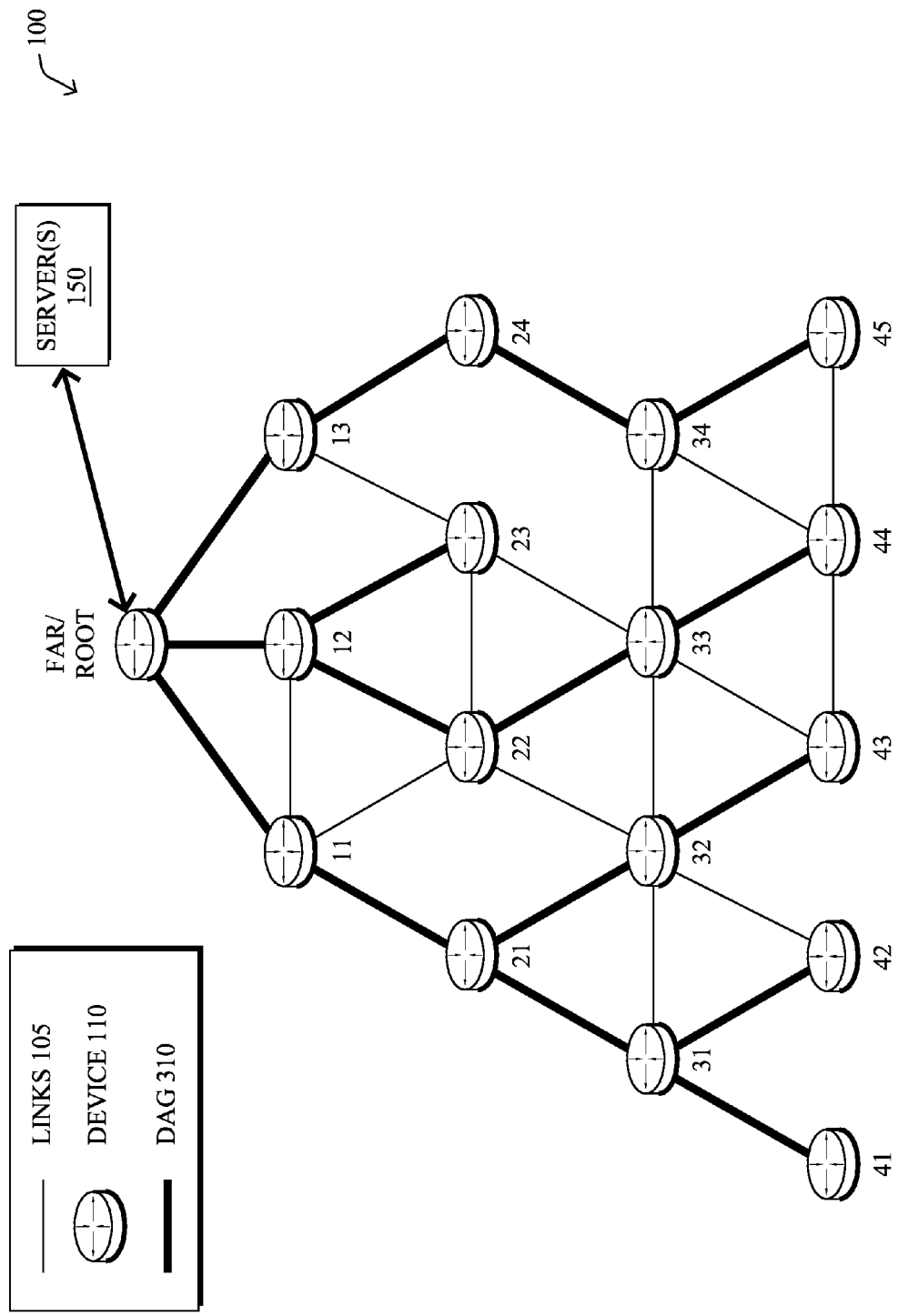
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

In particular, many LMs can be expressed in the form of a probabilistic graphical model also called Bayesian Network (BN). A BN is a graph G=(V,E) where V is the set of vertices and E is the set of edges. The vertices are random variables, e.g., X, Y, and Z (see FIG. 4) whose joint distribution P(X,Y, Z) is given by a product of conditional probabilities:

$$P(X,Y,Z)=P(Z|X,Y)P(Y|X)P(X) \tag{Eq. 1}$$

Figure 4:
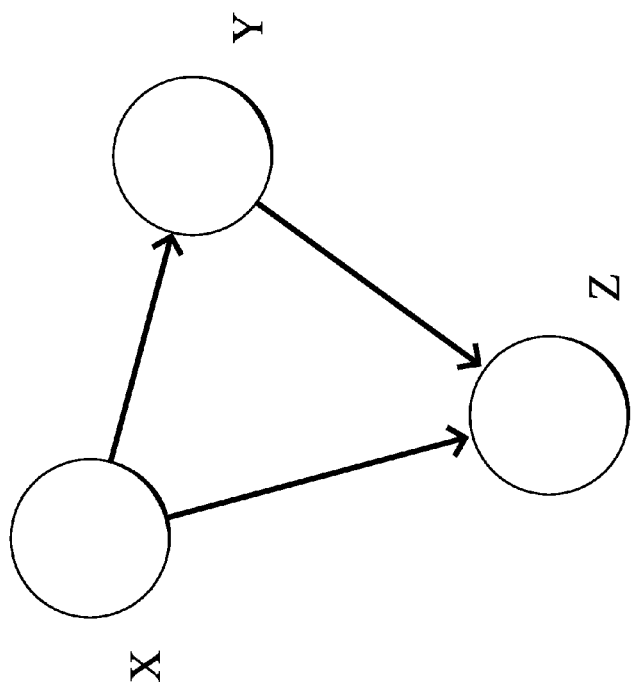
FIG. 4 illustrates an example Bayesian network.

The conditional probabilities in Eq. 1 are given by the edges of the graph in FIG. 4. In the context of LMs, BNs are used to construct the model M as well as its parameters.

To estimate the relationship between network properties of a node I (or link), noted $x_i$, (e.g., hop count, rank, firmware version, etc.) and a given networking metric $M_i$, a linear regression may be performed. More specifically, given the following equation:

$$M_i = F(x_i) = b^T x_i + \epsilon \tag{Eq. 2}$$

where $x_i$ is a d-dimensional vector of observed data (e.g., end-node properties such as the rank, the hop count, the distance to the FAR, etc.) and $M_i$ is the target metric (e.g., the time to join the network), which is also noted $y_i$ sometimes. Building such a model of a performance metric knowing a set of observed features is critical to perform root cause analysis, network monitoring, and configuration: for example the path delay as a function of the node rank, link quality, etc., can then be used to determine whether anomalies appear in the network and thus take some appropriate actions to fix the issue. In the equation (Eq. 2) above, the term $\epsilon$ is a Gaussian random variable used to model the uncertainty and/or the noise on the estimate $M_i$. The linear regression consists in finding the weight vector b that fulfills the maximum likelihood criterion (which coincides with the least square criterion when $\epsilon$ is Gaussian). In particular, the optimal b must minimize the Mean Squared Error (MSE):

$$MSE = \Sigma_i (b^T x_i - y_i)^2 / N \tag{Eq. 3}$$

where N is the total number of input data points, i.e., i= 1, ..., N.

In other words, b is a set of weights for each observed value $x_i$, used to compute the function F that provides the value of F. The MSE is a metric used to compute the "quality" of the model function F.

The usual approach to the solving of Eq. (2) is the ordinary least square (OLS) equation, which involves a "d×d" matrix inversion, where d is the number of dimensions. Three main problems arise immediately: (i) the dimensionality of $x_i$ may be large, thus making OLS prohibitively expensive in terms of computational cost (approximately $O(d^3)$), (ii) in presence of co-linearity (i.e., when several node properties are strongly correlated, as it is the case for the hop count and the ETX, for instance), OLS becomes numerically unstable (i.e., round-off and truncation errors are magnified, causing the MSE to grow exponentially), (iii) OLS being essentially non-probabilistic (i.e., it doesn't account for the whole distribution of its constituent variables, but it merely tracks averages), it cannot cope well with noise and outliers, and it is simply not applicable when $\epsilon$ is not Gaussian.

Figure 5:
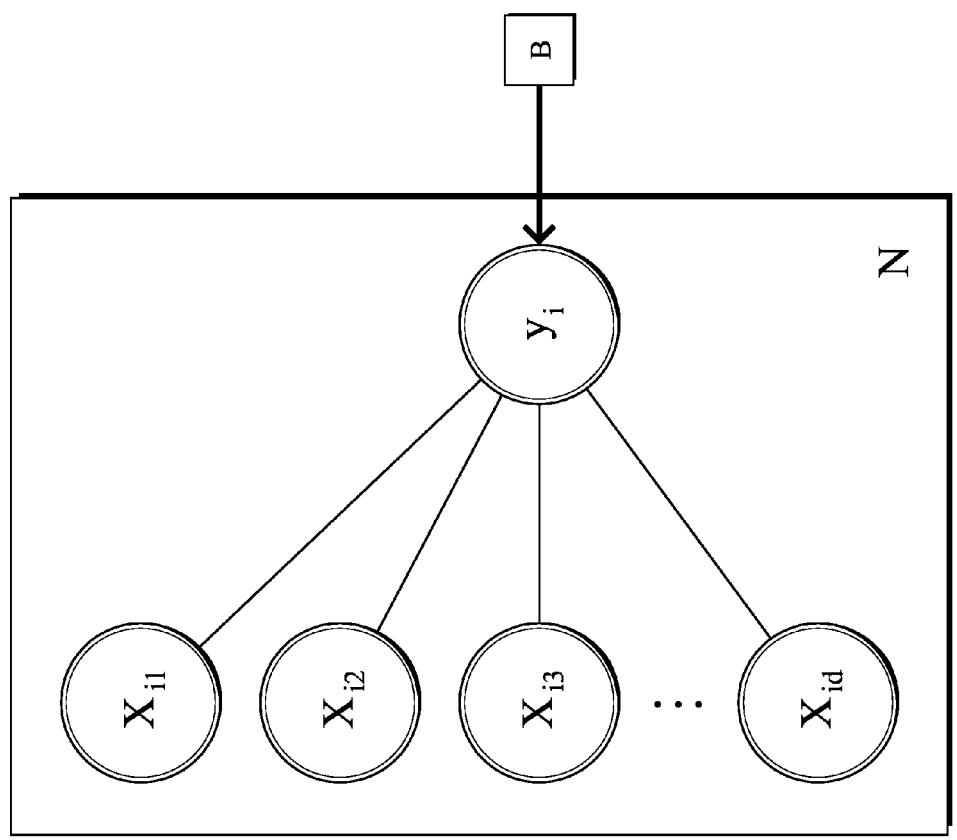
FIG. 5 illustrates an example Bayesian network for linear regression.

To overcome these limitations, the problem can be formulated as a BN (see FIG. 5). Now, all variables are considered as random variables, even though they are all observed at this point: both input variable $x_i$ and the output variable $y_i$ are experimental data, and b is a (non-probabilistic) parameter of the BN at this point. By pushing this approach a little bit further, one may turn b into a random variable as well, and attempt to infer it from experimental data (that is, the observations of $x_i$ and $y_i$). However, this inference problem is non-trivial, especially as one desirable feature of this learning algorithm is that it is capable of identifying non-relevant dimensionalities of x (that is, input dimensions that are weakly correlated with the output x), and automatically set the corresponding weights in b to a zero (or a very small) value.

This problem is solved by one recently proposed algorithm called Variational Bayes Least Square (VBLS) regression (Ting, D'Souza, Vijayakumar, & Schaal, 2010). Namely, this algorithm allows for efficient learning and feature selection in high-dimensional regression problems, while avoiding the use of expensive and numerically brittle matrix inversion. VBLS adds a series of non-observed random variables $z_{ij}$ that can be considered as noisy, fake targets of the factor $b_j \cdot x_{ij}$, and whose sum $\Sigma_j z_{ij}$ is an estimate of $y_i$. In turn, the weights $b_j$ are modeled as random variables, thereby allowing for automated feature detection, i.e., the mean of $b_j$ converges rapidly to zero if no correlation exists between the various $x_{ij}$ and $y_i$.

VBLS estimates the distribution of the non-observed variables $z_i$ and b using a variant of the Expectation Maximization algorithm with a variational approximation for the posterior distributions, which are not analytically tractable. Because it is a fully Bayesian approach, VBLS does not require any parameterization, except for the initial (prior) distributions of hidden parameters, which are set in an uninformative way, i.e., with very large variances that lead to flat distributions.

A Predictive LM-Based Approach to Detect Out-Of-SLA Traffic in LLNs

For the past two decades or so, the paradigm for service level agreement (SLA) monitoring consisted in 1) designing a network in light of the required SLA for the set of deployed application, 2) Monitoring the network in order to see whether or not the SLA were met, and then 3) readjusting the network design accordingly when needed. For example, Service Providers have been collecting statistics/prediction or traffic flow, perform network provisioning and performance tuning using a variety of tools to predict the required capacity, design the network topology, tune various protocol parameters (routing metrics, set of MPLS TE LSPs, etc.). In some cases, on-demand provisioning were used thanks to technologies such as (G)MPLS combined with a Path Computation Element to set up specific TE LSPs, Optical path, etc. in light of near "real-time" demands.

Such an approach is not only extremely cumbersome, but it exhibits a poor scalability. Even more importantly, it requires deep technology expertise from the end-user. Furthermore, verifying SLAs is extremely costly requiring the use of probing mechanisms such as IP SLA whereby tagged probes are generated among a set of meshed end-points. With the deployment of ultra large scale LLNs in the context of the Internet of Things, one of the main requests from customers would be to simply express their SLA to an engine.

An aim of the techniques herein is to provide an approach allowing an NMS to provide the targeted set of SLAs for a Network N to an on-line/distributed engine that would in turn make use of a Learning Machine as to predict whether or not the SLA will effectively be met. The notion of Predictive Performance Analysis (PPA) using a LM is crucial since in such constrained networks it becomes impossible to check whether the SLA are met. Indeed, the number of nodes is extremely large (thus the number of probes between all pairs of node would be prohibitive and be detrimental for the QoS offered to the traffic itself), the bandwidth is usually highly constrained and the number of different classes of applications is potentially large.

Said differently, the techniques herein specify a paradigm shift allowing for SLA prediction in a constrained network using Learning Machines. A user/NMS agent originates requests to dynamically discovered LMs in order to specify a list of classes of service (CoS) of interest, without having to specify a list of node. Upon receiving such a request a LM dynamically determines the list of network characteristics and path for which such predictions are required. Notifications are then provided back to the NMS or the user/application, thus forming a control loop between the user/NMS agent and the performance predictive analytics engine hosted on a FAR. Note that although described in the context of LLNs, the techniques herein also apply to remote site (e.g., a branch office) connected to the public Internet via a E1/T1 uplink of a SP network MPLS service.

Notably, a number of tools are currently available for SLA monitoring. That being said, all existing approaches require knowing a priori the set of nodes for which the SLA must be monitored. More importantly, the model has been such that SLAs are checked as opposed to being predicted using a Learning Machine, such as described herein, which leads to a true, and much more scalable, paradigm shift, which is of the utmost important for large scale constrained networks such as LLNs in the Internet of Things.

Operationally, a first component of the techniques herein lies in establishing a control loop between an NMS agent and a Learning Machine (LM) hosted on a router such as a Field Area Router (FAR). To that end, the techniques herein specify a newly defined IPv6 message sent by the NMS (or any user-based agent) to the FAR. A new routing protocol extension is specified for the FAR to specify that it hosts an LM. In the case of RPL, the techniques herein make use of the node routing metrics specified in RFC6551; in the case of OSPF, the techniques herein make use of a Type 10/11 Opaque LSA, a new TPL carried out in an ISIS LSP, and the same TLV in BGP. In one embodiment, the agent can communicate with the LM to query its capabilities, features that are offered and characteristics/specializations of its computational abilities. In another embodiment the LM can point the agent to another LM dedicated for SLA monitoring and prediction.

Once a FAR has been detected as hosting a LM capable of SLA monitoring and prediction, the NMS sends the specified IPv6 unicast message (e.g., a CoAP message in the case of a FAR connected via a constrained 3G link, or alternatively an SNMPv3 message for less-constrained networks). The unicast IPv6 message called SLA_Mon comprises the following parameters:

List of applications and related CoS (Class of Service) with the set of associated SLA parameters such as the delay, jitter, path reliability.

(optionally) the list of nodes of interest.

For each of the SLA parameters the NMS may indicate whether it is a hard bound (report if estimate delay exceeds a value D1) optionally along with a margin (M %).

(optionally) a schedule for SLA prediction (time, date, etc.) or a period of time T.

In one embodiment, the NMS can merely use this feature to query the LM for specific SLAs without having any real traffic traversing the network requiring these SLAs. This methodology can be used to pre-plan and design the network for future traffic demands and when new classes of applications are to be enabled.

Note that in contrast with existing approach the list of nodes is optional, relaxing the NMS from having to specify the list of nodes, instead simply specifying the SLA for each application. Note also that user data analytics tools do exist that are capable of translating application requirements into SLA network parameters.

The second component of the techniques herein is related to the local processing of the SLA_Mon message by the LM located on the router/FAR and the process to determine a list of CoS if it is not provided by the NMS. The list of CoS expressed as a list of vectors where each vector represents the performances metrics per application. Note also that an application may be represented by a pre-defined string, or a TCP/UDP port (not possible with dynamically allocated UDP/TCP port). At this point, if the nodes of interest for each CoS are explicitly listed, the list is communicated to the LM. Otherwise, local tools are used in order to dynamically determine the list of communicating pairs of nodes per CoS(i). There are many mechanisms to do this. If the routing protocol mandates for each packet to transit via the FAR where the LM is hosted (such as RPL in non-storing-mode where packets are routed hop by hop up to the FAR and then source routed down to their destination), various Software Defined Networking techniques may be used such as DPI of the control packets using OnePK Data Path Service Set. This can be potentially augmented with NBAR to build the list of communicating nodes. If the protocol supports point-to-point communication (for example with RPL storing mode or a reactive routing protocol such as Load-NG), the LM multicasts a newly defined IPv6 packet carrying a TLV provided by the NMS agent. This requests each node in the network to notify whether they originate user or control plane traffic of any of the CoS listed in the TLV. Replies are then provided to the LM in the form of either a newly defined unicast IPv6 packet using CoAP or piggybacked on the routing protocol control packet (for example, a newly defined vector is added to the node routing metric where each flag (0 or 1) using the flag field vector indicating origin of Class(i) traffic by the node). Each report is then sent to the LM after the expiration of a timer inversely proportional to the distance of the node to the LM so as to perform data fusion as report progress toward the FAR.

The third component of the techniques herein consists of transferring to the LM (i) the list of SLA requirements per CoS and (ii) the list of nodes and CoS of traffic they originate. The latter list could be obtained from the component above if it had not been provided by the NMS. Note that the second component allows for generating the list of nodes for which SLA monitoring is required if it has not been provided to it. This is in contrast with existing approaches where this list could be pre-generated using offline network provisioning tools. Using the two lists, the LM employs the following algorithm for prediction.

Algorithm:

The list of paths is derived for each pair of nodes sending traffic of interest using the routing topology. In this context, a path includes the source (or the point of ingress), the destination (or the point of egress). Ingress and egress points are relevant if the CoS of the transit traffic between is subject to SLA.

The techniques herein then use a link-wise performance prediction provided by the LM in order to map the estimates of network performance metrics with the targeted SLA. For example, if a delay of X ms (e.g., "performance metric") is required for a CoS C (e.g., "network traffic parameter"), the LM determines the set of nodes originating packets of CoS C, and computes a prediction of the delay D for each path followed by these packets.

Based on this prediction D, the LM may then determine whether the SLA requirement is satisfied (i.e., by comparing the requirement X and the prediction D).

The fourth component of the techniques herein is a newly defined unicast message called SLA_Pred sent by the LM in order to report prediction for each CoS that exceeds the SLA target +/− a margin M. In one embodiment, the message may simply list the SLAs that the LM predict as not being met; in another embodiment the node may include the list of nodes affected in addition to the paths involved by the traffic out of SLA (this could be advantageously used in order to take specific action such as increase a link bandwidth, for example by reducing the transmission rate, change coding, etc.).

Then, the NMS may decide to potentially adjust the SLA (thus creating a control loop with the LM) or take other actions (modify the QoS, act on network provisioning, etc.). In one embodiment, after receiving the response from the LM, the NMS can decide to reduce the SLAs of some of the lesser sensitive traffic and then ask the LM to run the prediction algorithm in an "offline" mode (without re-generating the list) for re-computation.

Figure 6:
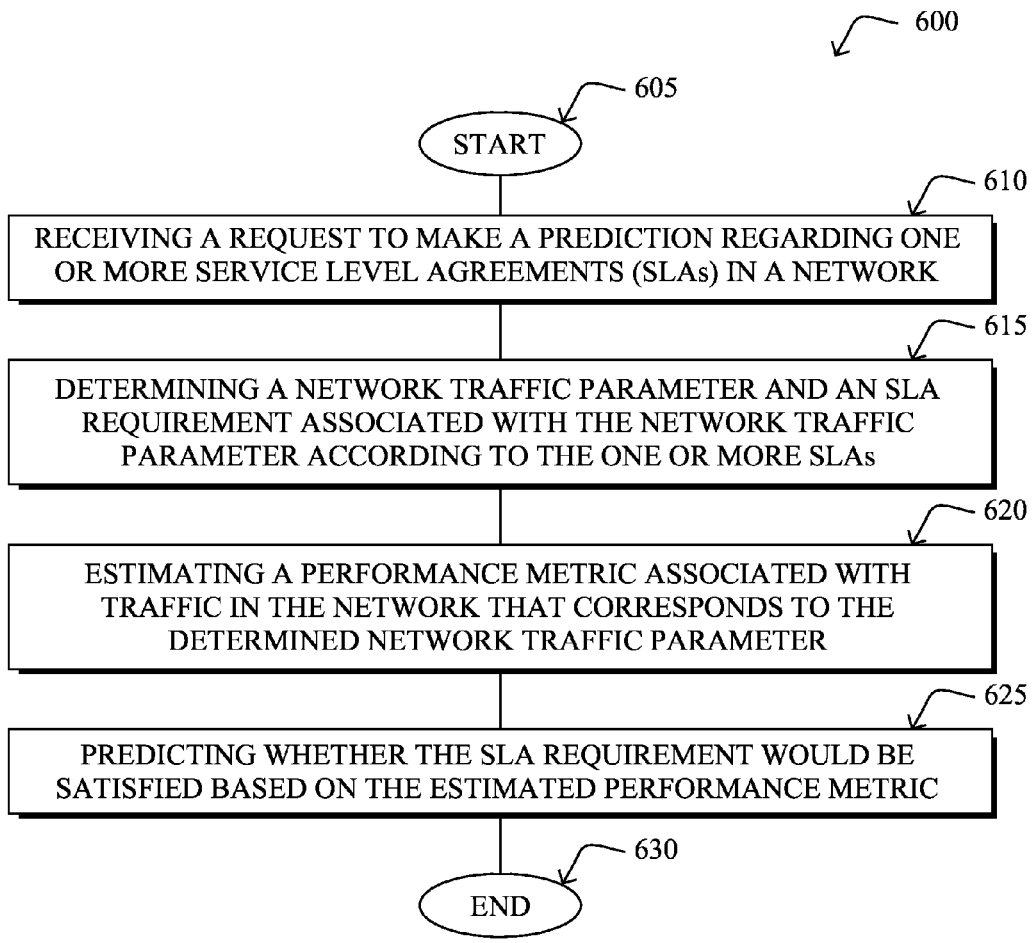
FIG. 6 illustrates an example simplified procedure for a predictive learning machine-based approach to detect traffic outside of service level agreements.

FIG. 6 illustrates an example simplified procedure for a predictive learning machine-based approach to detect traffic outside of service level agreements. The procedure 600 may start at step 605, continue to step 610, and so forth.

At step 610, a request to make a prediction regarding one or more service level agreements (SLAs) in a network is received. At step 615, a network traffic parameter and an SLA requirement associated with the network traffic parameter according to the one or more SLAs are also determined. In addition, at step 620, a performance metric associated with traffic in the network that corresponds to the determined network traffic parameter is estimated. The performance metric may relate to one or more of, for example, delay, jitter, path reliability, quality of service (QoS), and a routing metric, whereas the network traffic parameter may relate to, for example, class of service (CoS). At step 625, it may then be predicted whether the SLA requirement would be satisfied based on the estimated performance metric. The procedure 600 may illustratively end at step 630. The techniques by which the steps of procedure 600 may be performed, as well as ancillary procedures and parameters, are described in detail above.

It should be noted that the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a predictive LM-based approach to detect out-of-SLA traffic in LLNs. In particular, the techniques herein allow for not having to explicitly determine which nodes must be monitored and even more importantly no probes are effectively generated in the network, which is critical in most environments. Thanks to a control loop between a user agent/NMS and a Learning Machine hosted on an edge router, SLAs are predicted for all nodes or interest in the network, a critical function of the network, currently not possible using existing techniques.

Using a Closed-Loop Control Approach to Adapt a Routing Topology Based on LM-Predicted Delays and SLA Requirements One of the major challenges in all networks lies in closed-loop control: once the SLAs have been determined, a manual process consists in determining the best routing strategy (e.g., determining the best objective function, routing metrics, etc.), then monitoring paths using costly probing and manually correcting the routing protocol metrics accordingly, when possible. The techniques herein specify a lightweight approach that consists in using a required SLA, a predictive model to temporarily and dynamically provision an alternate path, and closed-loop control.

In particular, the techniques herein specify a Learning Machine based mechanism that contrasts with existing approaches in using predicted link-wise QoS metrics. Specifically, the techniques herein use the required SLA for a class of service $C_i$ and the predictive performance on a link determined by a LM. Taking into account the level of confidence of the Learning Machine and the upper bound acceptable SLA for the class of service $C_i$, the LM computes alternate paths for all paths that do not satisfy the SLA according to the predictive model. The output is a set of new paths that may be used according to a specific schedule with potential overlap in space but not in time, at which point, the LM starts collecting additional information thanks to pro-active probing in order to refine its estimate. The last component is the closed-loop control allowing use of alternate paths for a specific period of time and/or to pro-actively remove such paths if the LM estimates that delays along the path computed by the routing protocol are likely to satisfy the requirement. Note that the LM becomes stateful (remembering the list of alternate paths) in order to continually adjust path where needed according to predictive performance models.

Notably, an approach may be used herein for a Learning Machine (LM) to determine whether traffic in the LLN of a class C exists, the set of nodes exchanging traffic of class C, and the probability that the traffic of class C will indeed meet the SLA provided by a user or a NMS. More specifically, a link-wise performance prediction provided by the LM may be used to compute the estimates of network performance metrics with the targeted SLA. For example, if a delay of X ms is required for a CoS C, the LM determines the set of nodes originating packets of CoS C, and computes an estimate of the delay D for each path followed by these packets. Then a message may be sent by the LM in order to report prediction for each CoS that exceeds the SLA target +/− a margin M. The message may include the list of nodes affected in addition to the paths involved by the traffic out of SLA.

Operationally, the techniques herein specify a closed-loop control between the LM and the network in order to dynamically adjust the routing topology in light of the predicted SLA, in the form of a control loop. Notably, one approach might be to gather information about physical connectivity, various link characteristics (variation of the link quality, bandwidth, etc.) and emulate the behavior of a distributed routing protocol such as RPL or Load-NG using a LM in order to compute the routing protocol parameters (tuning of various parameters, change of the Objective Function, etc.) that would maximize the probability to indeed meet the SLA. Such an approach is used for large-scale network with predictable/deterministic behavior but unfortunately it is not generally viable in highly stochastic network such as LLNs. By contrast, in the techniques herein an approach is specified whereby two newly defined inputs are used to locally and temporarily adapt the routing topology using a predictive approach. Instead of measuring the delay (or any other metrics such as the jitter or packet loss), two inputs are used to compute alternate paths (i.e., paths not computed by the routing protocol): the per-class SLA and the predictive performance provided by the Learning Machine. Notably, this approach does not use traditional metric based link characterization.

According to the techniques herein, for each class of service (CoS), the required SLA (called SLA(c)) is retrieved from the user/NMS request and a predicted SLA is computed by the LM referred to as Pred_SLA(c).

Two parameters are then used, the margin M (computed by the LM that characterizes the confidence of the LM-based predictive algorithm) along with the factor W specified by the application, user, NMS or locally configured to determine when a routing topology change is required. M denotes the upper bound of the possible SLA degradation that may be offered to the corresponding class of traffic. E denotes the maximum SLA degradation tolerance a user has after which it requests a route change. For example, if the required SLA for the class of service C1 is 140 ms (should the SLA be related to delay), and Pred_SLA(C1)=170 ms with M=20 ms and E=40 ms, this means that the LM predicts that the delay may be as large as 170+20=190 ms and the user specifies to take an action if the delay is likely to exceed 140+40 ms. It is worth mentioning that since LLNs are stochastic networks that may exhibit multiple modalities, one may use more complex forms of these conditions that simple thresholds based on simple confidence intervals.

Then the LM or a computing entity that may reside within the Field Are Router or a controller builds a list of paths P={P1, P2, ..., Pn} that must be modified for the corresponding nodes to meet the SLA. Note that such paths are the paths computed by the routing protocol and currently used by the LLN; in the case of a pro-active routing protocol such as RPL, such paths are retrieved from the Network topology Database (NDB). If the routing protocol is Link-state, the engine could extract such paths by running (incremental) SPF using the Dijsktra algorithm from all nodes in the network using the LSDB. If the routing protocol is a reactive routing protocol such as Load-ng, the techniques herein specify a newly defined unicast message called Disc_Path that carries out the computed paths used for a given period of time T exceeding a pre-configurable threshold that is sent to the computing engine for long-lived paths. The Disc_Path( ) message is made of all nodes traversed by the paths where the nodes can be identified thanks to their (compressed) address, an ID or one may use a bloom filter to retrieve the set of nodes in the path (false positives are likely resolved by inspecting the overall connectivity thanks to other paths known in the network).

For each element Pi of P, the engine will compute a new path Qi using the LM (not using the existing computed metric retrieved from the routing protocol but its link-wise estimates instead) in order to find a path for which the predicted SLA for the class ci would be such that Pred_SLA(c1)+M<SLA(c1)+E (or other forms of more complex statistical model using probability distribution). The search for such a path is made using the link-wise predictive algorithm and an iterative approach, which will converge quickly with the number of paths being bounded. Note that in contrast with other approaches, SLA for all new paths in the set Q are predicted simultaneously since a change of a Path Qi may have implication on a previously computed Path Qj. Thus serializing these estimations may lead to incorrect output. In another embodiment, if SLAs for all newly computed paths cannot be met, the set with the maximum number of paths in Q that satisfy the SLA will be picked. This can also be configured using rules that depend on the depth of nodes, centrality of nodes in the topology, physical location, etc. In another embodiment, multiple NP sets could be used at separate times in a day based on observed topological events.

The set of new paths are then provisioned on remote nodes thanks to a newly defined message New_path(Qi) that carries the following information: 1) Set of nodes along the new path; 2) Class of service traffic that should be steered onto the new path; 3) an optional period of time T or schedule should the path be temporary or used during specific period of time according to a computed schedule S; 4) additional information related to active probing on the path Qi.

In contrast with existing approaches, the newly computed path Qi may be used for a specific period of time or according to a schedule S. Indeed, the LM may be fed with the traffic matrix, allowing the LM to estimate delay variations according to time; consequently, the traffic may be scheduled and path may overlap spatially but not in time (e.g., the LM may compute Qi and Qj such that they are not used at the same time, if it turns out that traffic carried along those paths would result in not satisfying the SLA and other diverse paths could not be found).

Furthermore the computing engine is stateful, remembering all provisioned new paths. Optionally, path liveness may be activated in order for each head-end of a computed path Qi to report the liveness of the source routed path to the computed engine. In this case, a hash-function may be used to compute an ID for each provisioned path (using the source/destination address, class of service, etc. for the Path Qi). The list of ID is then provided on a regular basis to the computing engine thanks to a newly defined network management message or may alternatively be piggybacked in the routing protocol (e.g., as a new TLV carried in the DAO message should RPL be the routing protocol in use).

Once installed on a node Ni, the traffic of class Ci would start flowing in the network using the Path Qi for a period of time Ti and/or according to the schedule Si. As specified above, the LM may request Ni to start activate pro-active probing along the path Qi, in order to refine its estimate and make sure that the new path Qi effectively meets the requirement SLA for Ci. Reports are then provided back to the LM in the form of a novel network management message or may alternatively be piggybacked in routing protocol message (e.g., a DAO message with RPL, an opaque LSA for OSPF, etc.).

The last component of the techniques herein lies in closing the loop. Temporary paths may be installed for a period of time T and then automatically removed. In another embodiment, the LM may continuously refine its link-wise regression model, and upon detecting that the path Qi is no longer required a unicast message New_path(Qi) is sent to the node with T=0 which will tear down the new path. At which point the LM may continue to require the sending of probe along the original routing topology path Pi in order to check its SLA prediction (potentially with different parameters, probes may be sent immediately and then at a slower rate).

The techniques described herein, therefore, provide for using a closed-loop control approach to adapt a routing topology based on LM-predicted delays and SLA requirements. In particular, the techniques herein (in contrast with existing models) use a distributed routing protocol and the output of predictive performance algorithm in order to pro-actively configure alternate paths without heavy probing and a manual reactive approach. Notably, as of today, the user determines the SLA, then provisions the network, tunes QoS, routing, etc., and then a posteriori use the NMS and other tools hoping that the SLAs will be met. This is acceptable in large SP networks, thanks to the use of traffic engineering, overbooking factors, over-provisioning of bandwidth and then use of heavy probing to check. In contrast, in the techniques herein, first the LM will learn the SLA of the applications, then predictive models are used to determine whether or not there are traffic whose SLA would not be met. Then the LM will then dynamically push a static route where needed in the network, without having to change the routing topology as a modification of the routing protocol using a dynamic metric would lead to various known problems. As such, the techniques herein are scalable and predictable. In addition, the closed-loop control, where such LM-computed path are dynamically computed and provisioned and then removed, are also particularly beneficial.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

While there have been shown and described illustrative embodiments that provide for learning-machine-based predictive and proactive computer networking and associated monitoring, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
  receiving from a centralized management node a request to make a prediction regarding one or more service level agreements (SLAs) in a network at a router configured to execute a learning machine (LM) algorithm;
  establishing a control loop between the centralized management node and the router;
  determining, by the router, a network traffic parameter and an SLA requirement associated with the network traffic parameter according to the one or more SLAs;
  estimating, by the router, a performance metric associated with a particular communication path in the network that corresponds to the determined network traffic parameter; and
  predicting, by the router, whether the SLA requirement would be satisfied based on the estimated performance metric.

2. The method according to claim 1, further comprising:
  dynamically adjusting a routing topology of the network when it is predicted that the SLA requirement would not be satisfied.

3. The method according to claim 1, further comprising:
  computing one or more alternate communication paths that differ from the particular communication path when it is predicted that the SLA requirement would not be satisfied.

4. The method according to claim 3, further comprising:
  defining a schedule according to which the one or more computed alternate communication paths may be utilized.

5. The method according to claim 1, further comprising:
  receiving a message indicating the network traffic parameter and the SLA requirement associated with the network traffic parameter.

6. The method according to claim 1, further comprising:
  reporting results of the predicting to the centralized management node in the network.

7. The method according to claim 1, further comprising:
  determining one or more nodes in the network and their corresponding communication path that corresponds to the determined network traffic parameter.

8. The method according to claim 1, wherein the predicting of whether the SLA requirement would be satisfied further comprises:
  determining whether the estimated performance metric satisfies a threshold amount defined by the SLA requirement.

9. The method according to claim 1, further comprising:
  establishing one or more of a time at which the predicting is to be performed and a period of time during which the predicting is to be performed.

10. The method according to claim 1, further comprising:
  receiving an instruction to adjust a prediction algorithm used to perform the predicting.

11. The method according to claim 1, further comprising:
  automatically discovering the particular communication path that corresponds to the determined network traffic parameter.

12. The method according to claim 1, wherein the predicting is performed by the LM algorithm.

13. An apparatus, comprising:
  one or more network interfaces that communicate with a network;
  a processor coupled to the one or more network interfaces and configured to execute a process which includes a learning machine (LM) algorithm; and
  a memory configured to store program instructions which contain the process executable by the processor, the process comprising:
    receiving from a centralized management node a request to make a prediction regarding one or more service level agreements (SLAs) in the network;
    establishing a control loop with the centralized management node;

determining a network traffic parameter and an SLA requirement associated with the network traffic parameter according to the one or more SLAs;

estimating a performance metric associated with a particular communication path in the network that corresponds to the determined network traffic parameter; and predicting whether the SLA requirement would be satisfied based on the estimated performance metric.

14. The apparatus according to claim 13, wherein the process further comprises:

dynamically adjusting a routing topology of the network when it is predicted that the SLA requirement would not be satisfied.

15. The apparatus according to claim 13, wherein the process further comprises:

computing one or more alternate communication paths that differ from the particular communication path when it is predicted that the SLA requirement would not be satisfied.

16. The apparatus according to claim 15, wherein the process further comprises:

defining a schedule according to which the one or more computed alternate communication paths may be utilized.

17. The apparatus according to claim 13, wherein the process further comprises:

receiving a message indicating the network traffic parameter and the SLA requirement associated with the network traffic parameter.

18. The apparatus according to claim 13, wherein the process further comprises:

reporting results of the predicting to the centralized management node in the network.

19. The apparatus according to claim 13, wherein the process further comprises:

determining one or more nodes in the network and their corresponding communication path that corresponds to the determined network traffic parameter.

20. The apparatus according to claim 13, wherein the predicting of whether the SLA requirement would be satisfied further comprises:

determining whether the estimated performance metric satisfies a threshold amount defined by the SLA requirement.

21. The apparatus according to claim 13, wherein the process further comprises:

establishing one or more of a time at which the predicting is to be performed and a period of time during which the predicting is to be performed.

22. The apparatus according to claim 13, wherein the process further comprises:

receiving an instruction to adjust a prediction algorithm used to perform the predicting.

23. The apparatus according to claim 13, wherein the process further comprises:

automatically discovering the particular communication path that corresponds to the determined network traffic parameter.

24. The apparatus according to claim 13, wherein the apparatus is a router executing the LM algorithm.

25. A tangible non-transitory computer readable medium storing program instructions that cause a computer to execute a process, the process comprising:

receiving from a centralized management node a request to make a prediction regarding one or more service level agreements (SLAs) in a network at a router configured to execute a learning machine (LM) algorithm;

establishing a control loop between the centralized management node and the router;

determining a network traffic parameter and an SLA requirement associated with the network traffic parameter according to the one or more SLAs;

estimating a performance metric associated with a particular communication path in the network that corresponds to the determined network traffic parameter; and predicting whether the SLA requirement would be satisfied based on the estimated performance metric.

* * * * *